United States Patent
Jang

(10) Patent No.: US 9,580,064 B2
(45) Date of Patent: Feb. 28, 2017

(54) METHOD AND SYSTEM FOR CONTROLLING FUEL PUMP FOR HYBRID DIESEL VEHICLE

(71) Applicant: Hyundai Motor Company, Seoul (KR)

(72) Inventor: Hwa Yong Jang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/680,713

(22) Filed: Apr. 7, 2015

(65) Prior Publication Data

US 2016/0137183 A1    May 19, 2016

(30) Foreign Application Priority Data

Nov. 14, 2014 (KR) .................. 10-2014-0158621

(51) Int. Cl.
| | |
|---|---|
| *B60W 20/00* | (2016.01) |
| *B60L 11/00* | (2006.01) |
| *B60W 10/06* | (2006.01) |
| *B60W 10/08* | (2006.01) |

(52) U.S. Cl.
CPC ............ *B60W 20/10* (2013.01); *B60W 10/06* (2013.01); *B60W 10/08* (2013.01); *B60W 20/40* (2013.01); *B60W 2510/1005* (2013.01); *B60W 2510/244* (2013.01); *B60W 2520/10* (2013.01); *B60W 2710/0616* (2013.01); *B60W 2710/08* (2013.01); *Y10S 903/905* (2013.01); *Y10S 903/93* (2013.01)

(58) Field of Classification Search
CPC combination set(s) only.
See application file for complete search history.

(56) References Cited

U.S. PATENT DOCUMENTS

2015/0120108 A1*  4/2015  Dudar ................. F02M 25/089
                                              701/22

FOREIGN PATENT DOCUMENTS

| CN | 101559770 A | 10/2009 |
|---|---|---|
| JP | 2000-064875 A | 2/2000 |
| JP | 2008-296698 A | 12/2008 |
| JP | 2010-894 A | 1/2010 |
| KR | 10-2009-0108924 A | 10/2009 |
| KR | 10-2010-0019892 A | 2/2010 |
| KR | 10-2010-0032169 A | 3/2010 |

* cited by examiner

*Primary Examiner* — Yonel Beaulieu
(74) *Attorney, Agent, or Firm* — Morgan, Lewis & Bockius LLP

(57) ABSTRACT

A method for controlling a fuel pump for a hybrid diesel vehicle may include determining, by a control device, whether to drive the hybrid diesel vehicle in an EV driving mode or in an engine driving mode by reflecting a vehicle driving state information value and stopping, by the control device, operation of a fuel pump relay when the determination is made to drive in the EV driving mode.

10 Claims, 2 Drawing Sheets

METHOD AND SYSTEM FOR CONTROLLING FUEL PUMP FOR HYBRID DIESEL VEHICLE

CROSS-REFERENCE(S) TO RELATED APPLICATIONS

The present application claims priority to Korean Patent Application Number 10-2014-0158621 filed Nov. 14, 2014, the entire contents of which is incorporated herein for all purposes by this reference.

BACKGROUND OF THE INVENTION

Field of the Invention

Various embodiments of the present invention relate to a method and system for controlling a fuel pump for a hybrid diesel vehicle; and particularly, to a technology for preventing unnecessary consumption of power charged in the battery of a vehicle by temporarily stopping the operation of a fuel pump in a driving mode when an engine is not required to be driven.

Description of Related Art

The operation procedure of a fuel pump mounted in a conventional diesel vehicle is as follows.

A fuel pump relay for running a fuel pump according to a pump control signal received by an ECU operates generally under the condition of ignition-on, cranking, or engine running, and occasionally, when it is determined whether or not the fuel pump is normally operated with an inspection device.

Meanwhile, a hybrid diesel vehicle, which has been recently developed and mass-produced, stops the operation of a fuel pump when the engine ignition is turned off, while the hybrid diesel vehicle is still maintained at an ignition-on state in an EV mode in which the vehicle travels only by a motor, thereby continuously operating the fuel pump.

That is to say, in spite of the fact that the hybrid diesel vehicle does not need to continuously and unnecessarily operate the fuel pump when traveling in the EV mode, the fuel pump operates while the hybrid diesel vehicle is traveling in the EV driving mode, so that power charged in a battery is unnecessarily consumed.

Accordingly, when the hybrid diesel vehicle travels in the EV mode, the engine is turned off, but the ignition-on state is still maintained, so that there is a problem in that the fuel pump continuously operates.

For this reason, the various aspects of the present invention are directed to providing a method and system for controlling a fuel pump for a hybrid diesel vehicle, which temporarily stops a fuel pump when a hybrid diesel vehicle travels in an EV mode, and prevents a delay in the operation of an engine and a shock of the vehicle due to sudden fuel supply by operating a fuel pump relay in advance to protect the fuel pump before shifting to an engine mode on the shifting from the EV mode to the engine mode.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and system for controlling a fuel pump for a hybrid diesel vehicle, which controls an unnecessary operation of a fuel pump relay while the hybrid diesel vehicle is traveling, and previously operates the fuel pump relay when a shift is performed from an EV driving mode to an engine driving mode.

According to various aspects of the present invention, a method for controlling a fuel pump for a hybrid diesel vehicle may include determining, by a controller, whether to drive the hybrid diesel vehicle in an EV driving mode or in an engine driving mode by reflecting a vehicle driving state information value, and stopping, by the controller, operation of a fuel pump relay when the determination is made to drive in the EV driving mode.

The method may further include, after the stopping the operation of the fuel pump relay, determining, by the controller, whether or not the vehicle being currently driven is in a preparation state to shift from the EV driving mode to the engine driving mode by reflecting the vehicle driving state information value, and when it is determined that the vehicle is in the preparation state to shift from the EV driving mode to the engine driving mode, previously operating the fuel pump relay, by the controller, a set reference time before a shift is performed to the engine driving mode.

The set reference time may correspond to a period of time taken for fuel supplied from a fuel tank to move to an engine side.

The vehicle driving state information value may include a speed, a gear level, an RPM, and a battery charge state of the vehicle being currently driven.

The controller may include a Hybrid Control Unit (HCU) receiving the vehicle driving state information from a driving information detection unit, and an Engine Control Unit (ECU) receiving, from the HCU, a signal representing whether the determination has been made to drive in the EV driving mode or the engine driving mode, and controlling the operation of the fuel pump relay.

The driving information detection unit may include a vehicle speed sensor detecting a driving speed, a gear level sensor detecting a position of a gear level, an RPM sensor detecting a number of rotations of an engine, and a charge state sensor for detecting a charge state of a battery.

The vehicle driving state information value may include a speed, a gear level, an RPM, and a battery charge state of the vehicle being currently driven.

According to various aspects of the present invention, a system for controlling a fuel pump for a hybrid diesel vehicle may include a driving information detection unit detecting a vehicle driving state value of the hybrid diesel vehicle, and a controller receiving vehicle driving information data transmitted from the driving information detection unit and determining whether to derive the hybrid diesel vehicle in an EV driving mode or in an engine driving mode, in which the controller stops operation of a fuel pump relay when the determination is made to drive in the EV driving mode, and previously operates the fuel pump relay a set reference time before a shift is performed to the engine driving mode when the determination is made to a preparation state to shift from the EV driving mode to the engine driving mode.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
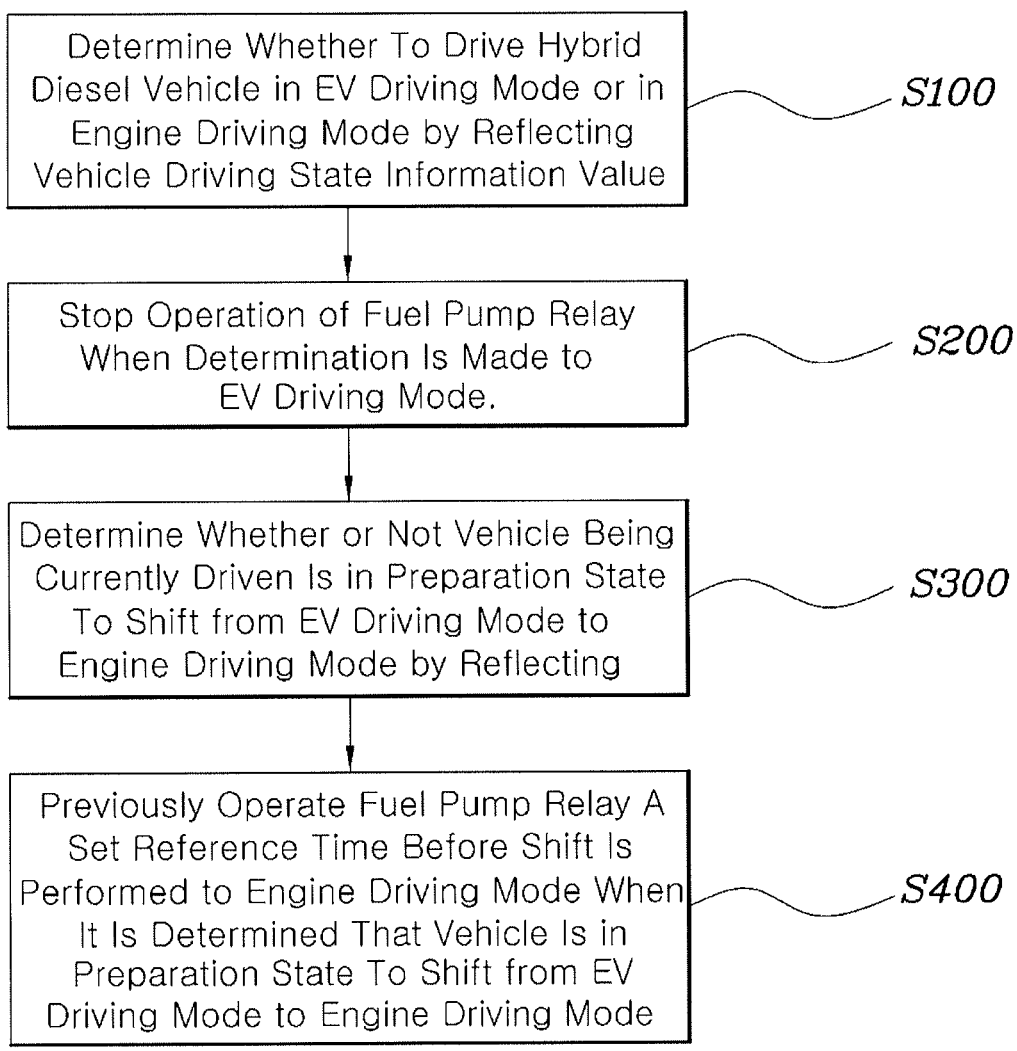
FIG. 1 is a flowchart illustrating the entire flow of an exemplary method for controlling a fuel pump for a hybrid diesel vehicle according to an exemplary embodiment of the present invention.

FIG. 1 is a flowchart illustrating the entire flow of a method for controlling a fuel pump for a hybrid diesel vehicle in accordance with various embodiments of the present invention.

As shown in FIG. 1, various embodiments of the present invention include a step S100, of determining whether to drive a hybrid diesel vehicle in an EV driving mode or an engine driving mode by reflecting a vehicle driving state information value, and a step S200 of stopping the operation of a fuel pump relay when it is determined to drive the vehicle in the EV driving mode.

That is to say, after driving state data of the vehicle is acquired using a vehicle speed sensor for detecting a driving speed to obtain driving state information of the vehicle, a gear level sensor for detecting the position of a gear level, an rpm sensor for detecting the number of rotations of an engine, and a charge state sensor for detecting the charge state of a battery, which are to be described later, it is determined whether the vehicle being currently driven is to be driven in the EV driving mode or in the engine driving mode.

Thereafter, when it is determined that the vehicle is to be driven in the EV driving mode, a stop signal is transmitted to the fuel pump relay which operates the fuel pump, so that the power of the battery is previously prevented from being unnecessarily consumed in the EV driving mode.

That is to say, a hybrid diesel vehicle is still maintained in an ignition-on state although a shift is performed to the EV driving mode. In this case, a fuel pump in the prior art is not turned off but operates to unnecessarily consume power. In contrast, according to an exemplary embodiment of the present invention, when a shift is performed to the EV driving mode, the operation of the fuel pump relay is stopped, thereby previously preventing the conventional problem as described above.

Meanwhile, referring again to FIG. 1, the method further includes a step S300 of determining whether or not the vehicle being currently driven is in a preparation state for shifting from the EV driving mode to the engine driving mode by reflecting a vehicle driving state information value after the step of stopping the operation of the fuel pump relay, and a step S400 of, when it is determined that the vehicle is in the preparation state for shifting from the EV driving mode to the engine driving mode, previously operating the fuel pump relay a set reference time before a shift is performed to the engine driving mode.

The technical feature of the present invention is to previously operate the fuel pump relay before a shift is performed to the engine driving mode, as described above, in order to prevent shock due to sudden fuel supply and a delay in the operation of the engine when the shift is performed from the EV driving mode to the engine driving mode.

That is to say, the fuel pump relay previously operates prior a set reference time to the time point when a shift is performed to the engine driving mode, thereby solving the problem as described above.

Meanwhile, the set reference time represents a period of time taken for fuel supplied from a fuel tank to move to the engine side.

That is to say, the set reference time means a period of time taken to supply sufficient fuel into a fuel supply line connected from the fuel tank to the fuel pump via a fuel filter, wherein the set reference time may vary depending on vehicles or vehicle driving states.

Meanwhile, the vehicle driving state information value includes the speed of a vehicle being currently driven, the gear level thereof, the rpm thereof, and the battery charge state thereof.

That is to say, by taking a vehicle speed, a gear level, and an rpm, and a battery charge state into consideration, it is determined whether the current vehicle is driven in the EV mode or in the engine mode, or is to shift from the EV mode to the engine mode.

Figure 2:
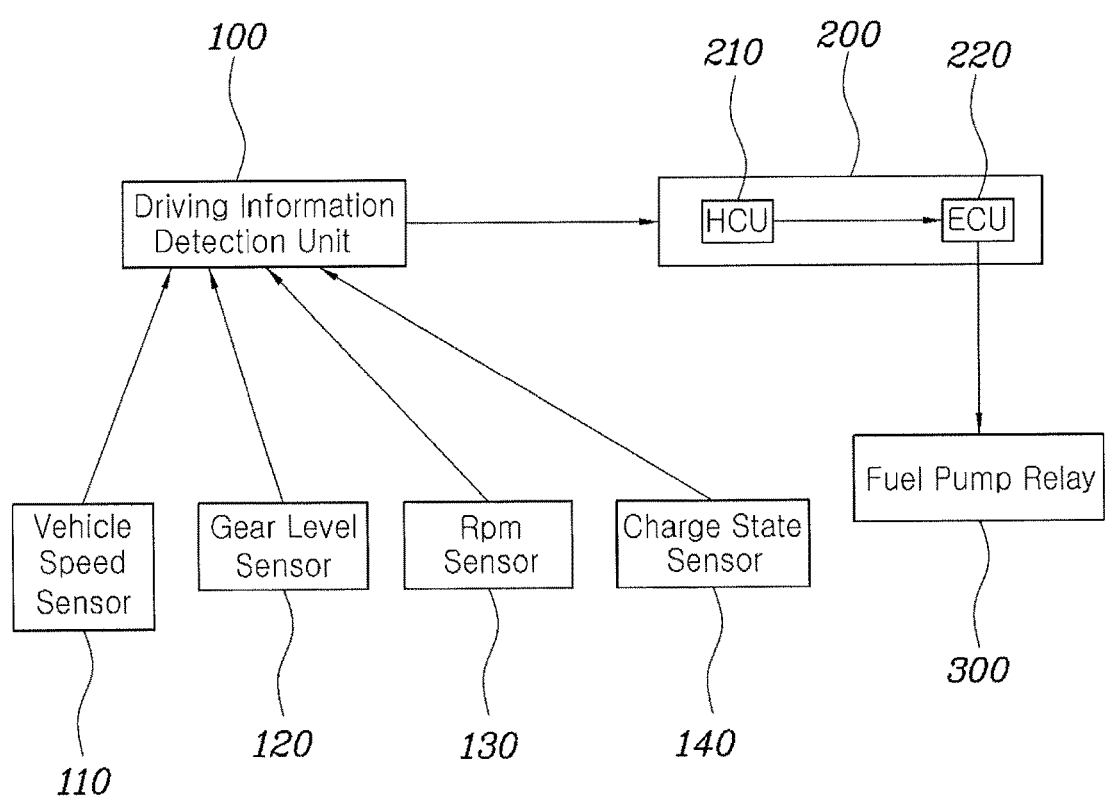
FIG. 2 is a block diagram illustrating the entire configuration of an exemplary system for controlling a fuel pump for a hybrid diesel vehicle according to an exemplary embodiment of the present invention.

Meanwhile, FIG. 2 is a block diagram illustrating the entire configuration of a system for controlling a fuel pump for a hybrid diesel vehicle in accordance with various embodiments of the present invention. As shown in FIG. 2, the system in accordance with various embodiments of the present invention includes a driving information detection unit 100, a control unit 200, and a fuel pump relay 300.

The driving information detection unit 100 detects a vehicle driving state value of a hybrid diesel vehicle, and the control unit 200 receives vehicle driving information data transmitted from the driving information detection unit 100 and determines whether the hybrid diesel vehicle is to be driven in an EV driving mode or in an engine driving mode.

In this case, when it is determined that the hybrid diesel vehicle is to be driven in the EV driving mode, the control unit 200 stops the operation of the fuel pump relay 300. In addition, when it is determined that the hybrid diesel vehicle is in a preparation state to shift from the EV driving mode to the engine driving mode, the control unit 200 previously operates the fuel pump relay 300 a set reference time before a shift is performed to the engine driving mode.

Meanwhile, as shown in FIG. 2, the driving information detection unit 100 includes a vehicle speed sensor 110 for detecting a driving speed, a gear level sensor 120 for detecting the position of a gear level, an rpm sensor 130 for detecting the number of rotations of an engine, and a charge state sensor 140 for detecting the charge state of a battery.

The control unit 200 includes a Hybrid Control Unit/Controller (HCU) 210 for receiving vehicle driving state information from the driving information detection unit 100, and an Engine Control Unit/Controller (ECU) 220 for receiving, from the HCU 210, a signal representing whether it has been determined that the vehicle is to be driven in the EV driving mode or in the engine driving mode, and controls the operation of the fuel pump relay.

According to the method and system for controlling a fuel pump for a hybrid diesel vehicle in accordance with various embodiments of the present invention, various effects described below are implemented.

First, it is possible to prevent loss of power charged in a battery due to an unnecessary operation of a fuel pump.

Secondly, the fuel pump previously operates when a shift is performed from the EV driving mode to the engine driving mode, so that a shock of the vehicle due to fuel supply and a delay in the operation of an engine can be prevented in advance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a fuel pump for a hybrid diesel vehicle, the method comprising:
   determining, by a control device, whether to drive the hybrid diesel vehicle in an EV driving mode or in an engine driving mode by reflecting a vehicle driving state information value;
   stopping, by the control device, operation of a fuel pump relay when the determination is made to drive in the EV driving mode; and
   after the stopping the operation of the fuel pump relay:
      determining, by the control device, whether or not the vehicle being currently driven is in a preparation state to shift from the EV driving mode to the engine driving mode by reflecting the vehicle driving state information value; and
      when the vehicle is determined to be in the preparation state to shift from the EV driving mode to the engine driving mode, previously operating the fuel pump relay, by the control device, a set reference time before a shift is performed to the engine driving mode.

2. The method of claim 1, wherein the set reference time corresponds to a period of time taken for fuel supplied from a fuel tank to move to an engine side.

3. The method of claim 1, wherein the vehicle driving state information value comprises a speed, a gear level, an RPM, and a battery charge state of the vehicle being currently driven.

4. The method of claim 1, wherein the control device comprises:
   a first controller receiving the vehicle driving state information from a driving information detection device; and
   a second controller receiving, from the first controller, a signal representing whether the determination has been made to drive in the EV driving mode or the engine driving mode, and controlling the operation of the fuel pump relay.

5. The system of claim 4, wherein the driving information detection device comprises:
   a vehicle speed sensor detecting a driving speed;
   a gear level sensor detecting a position of a gear level;
   an RPM sensor detecting a number of rotations of an engine; and
   a charge state sensor for detecting a charge state of a battery.

6. The method of claim 1, wherein the vehicle driving state information value comprises a speed, a gear level, an RPM, and a battery charge state of the vehicle being currently driven.

7. The method of claim 2, wherein the vehicle driving state information value comprises a speed, a gear level, an RPM, and a battery charge state of the vehicle being currently driven.

8. A system for controlling a fuel pump for a hybrid diesel vehicle, the system comprising:
   a driving information detection device detecting a vehicle driving state value of the hybrid diesel vehicle; and
   a control device receiving vehicle driving information data transmitted from the driving information detection device and determining whether to derive the hybrid diesel vehicle in an EV driving mode or in an engine driving mode,
   wherein the control device stops operation of a fuel pump relay when the determination is made to drive in the EV driving mode, and previously operates the fuel pump relay a set reference time before a shift is performed to the engine driving mode when the determination is made to a preparation state to shift from the EV driving mode to the engine driving mode.

9. The system of claim 8, wherein the driving information detection device comprises:
   a vehicle speed sensor detecting a driving speed;
   a gear level sensor detecting the position of a gear level;
   an RPM sensor detecting a number of rotations of an engine; and
   a charge state sensor detecting a charge state of a battery.

10. The system of claim 8, wherein the control device comprises:
   a first controller receiving vehicle driving state information from the driving information detection unit; and
   a second controller receiving, from the first controller, a signal representing whether the determination has been made to drive in the EV driving mode or the engine driving mode, and controlling the operation of the fuel pump relay.

* * * * *